United States Patent [19]

Hatch

[11] 4,146,807

[45] Mar. 27, 1979

[54] LIQUID METAL RACEWAY CURRENT COLLECTOR FOR HIGH SPEED ACYCLIC MACHINES

[75] Inventor: Burton D. Hatch, Ballston Lake, N.Y.

[73] Assignee: General Electric Company, Schenectady, N.Y.

[21] Appl. No.: 838,714

[22] Filed: Oct. 3, 1977

[51] Int. Cl.[2] .......... H02K 13/00

[52] U.S. Cl. .......... 310/219

[58] Field of Search .......... 310/219, 179, 178, 232

[56] References Cited

U.S. PATENT DOCUMENTS

| | | | |
|---|---|---|---|
| 1,184,224 | 5/1916 | Breslaver | 310/178 |
| 3,211,936 | 10/1965 | Harvey | 310/219 |
| 3,453,467 | 7/1969 | Harvey | 310/219 |
| 3,546,508 | 12/1970 | Harvey | 310/219 |
| 3,989,968 | 11/1976 | Hatch | 310/178 |
| 4,027,183 | 5/1977 | Hatch | 310/219 |

*Primary Examiner*—R. Skudy

*Attorney, Agent, or Firm*—Nathan D. Herkamp; Joseph T. Cohen; Leo I. MaLossi

[57] ABSTRACT

An electrical current collector for an acyclic machine employs a stator collector ring which encircles a rotor collector ring and includes a plurality of fins protruding radially-inward into a plurality of cage sectors, respectively, each cage sector axially defining a raceway through which liquid metal flows in continuous contact with both collector rings. The cage sectors are spring-biased toward the rotor collector ring but maintained out of contact therewith by circumferentially abutted spacing means and by liquid metal which fills the entire region between the rotor collector ring and each cage sector. The liquid metal in the raceway conducts current between the rotor collector ring and each cage sector.

11 Claims, 3 Drawing Figures

17
18
2
2
12
18
14
27
15
17
12
14
13
18
14
15
15
16
23
23
17
11
17
24
24
18

18
11
17
17
15
15
12
3
21
3
13
23
27
27
13
14
20
10

15
27
13
21
27
13

LIQUID METAL RACEWAY CURRENT COLLECTOR FOR HIGH SPEED ACYCLIC MACHINES

INTRODUCTION

This invention relates to acyclic machines employing liquid metal electrical current collectors, and more particularly to apparatus for maintaining liquid metal in contact with limited surface area at all angular velocities including zero.

In an acyclic machine using, instead of solid brushes, liquid metal collectors on a collector ring, the liquid metal forms a portion of the current-carrying loop. While the solid conductors (e.g., copper) may be mechanically supported through solid electrical insulation, relative rotation of the collector rings has, in the past, precluded positive containment of the liquid metal employed in place of brushes.

In generator applications heretofore, the liquid metal has been introduced into the collector gap after a suitable minimum speed had been attained by the rotor, and been removed whenever rotor angular velocity decreased below such minimum speed. Centrifugal force generated within the liquid as it is caused to rotate by the relatively-rotating collector rings has, in such applications, been successfully employed to retain the liquid metal in the collector site above the minimum rotor angular velocity. This is shown, for example, in L. M. Harvey U.S. Pat. Nos. 3,211,936, and 3,546,506, issued Oct. 12, 1965 and Dec. 8, 1970, respectively, both of which are assigned to the instant assignee. In these prior generators, if rotor angular velocity were to fall below a minimum value, or completely stop, the liquid metal would drain from its location in the collector gap. Hence the generator would normally not be operated at less than about 25% of its rated speed, nor at any speed in a reverse direction.

In motor applications, such as for ship propulsion, capability of applying full torque (and overload torques) at any and all motor speeds (e.g., up to 1500 rpm) in both directions of rotation, including zero speed and emergency reversals, is essential. At zero and low rotor angular velocities, centrifugal force is either completely unavailable, or insufficient to retain the liquid metal in the collector site. However, if the liquid metal is not retained in the collector site, either the electric circuit will be broken or electrical arc-over will occur. In either case, the motor will be rendered inoperative. To overcome these problems, the method and apparatus described and claimed in B. D. Hatch U.S. Pat. No. 3,989,968, issued Nov. 2, 1976, and J. D. Hurley U.S. Pat. No. 4,027,184, issued May 31, 1977, both of which patents are assigned to the instant assignee, have been devised. The invention in each of these patents is intended to prevent or counteract Lorentz expulsion forces on liquid metal in the current collectors of acyclic machines. According to the present invention, however, it is unnecessary to counteract the Lorentz expulsion forces inasmuch as the liquid metal is contained within a confined space which essentially precludes its expulsion under the influence of Lorentz forces.

In each of the aforementioned Hatch and Hurley patents, the contact between rotor and stator collector rings involves passage of electrical current through an intermediate metallic portion. Consequently, current passing between rotor and stator collector rings must flow through two, circumferentially-separated slugs of liquid metal. As a result, collector resistance is larger than it would be if only a single slug of liquid metal were interposed between the rotor and stator collector rings. Additionally, having four liquid metal and solid metal interfaces instead of two increases power losses by virtue of the increased interface resistance. The large amount of total wetted area, moreover, results in viscous losses which would be reduced if the total wetted area were reduced.

Accordingly, one object of the invention is to provide a liquid metal current collector which allows continuous electrical contact between predetermined sectors of an acyclic machine stator collector ring and the rotor collector ring thereof.

Another object is to provide a liquid metal current collector which exhibits reduced viscous drag losses in high speed machines, while allowing operation at and through zero operating speed.

Another object is to provide a single liquid metal electrical current transfer between rotor and stator collector rings in an acyclic machine.

Briefly, in accordance with a preferred embodiment of the invention, an electrical current collector for an acyclic machine comprises a rotor collector ring, a stator collector ring encircling the rotor collector ring, and a plurality of circumferentially-abutting cage sectors. Each of the cage sectors surrounds a stator fin, respectively, protruding radially-inward from the stator collector ring and terminating at a location closely adjacent the radially-outer surface of the rotor collector ring. A raceway is thereby formed in the space defined axially and circumferentially by the cage sectors and radially by the radially-innermost surfaces of the fins and the radially-outermost surface of the rotor collector ring. Means are provided for biasing the cage sectors toward the radially-outermost surface of the rotor collector ring. Liquid metal is situated in the raceway in contact with the radially-innermost surfaces of the stator fins and the radially-outermost surface of the rotor collector ring.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DESCRIPTION OF TYPICAL EMBODIMENTS

Figure 1:
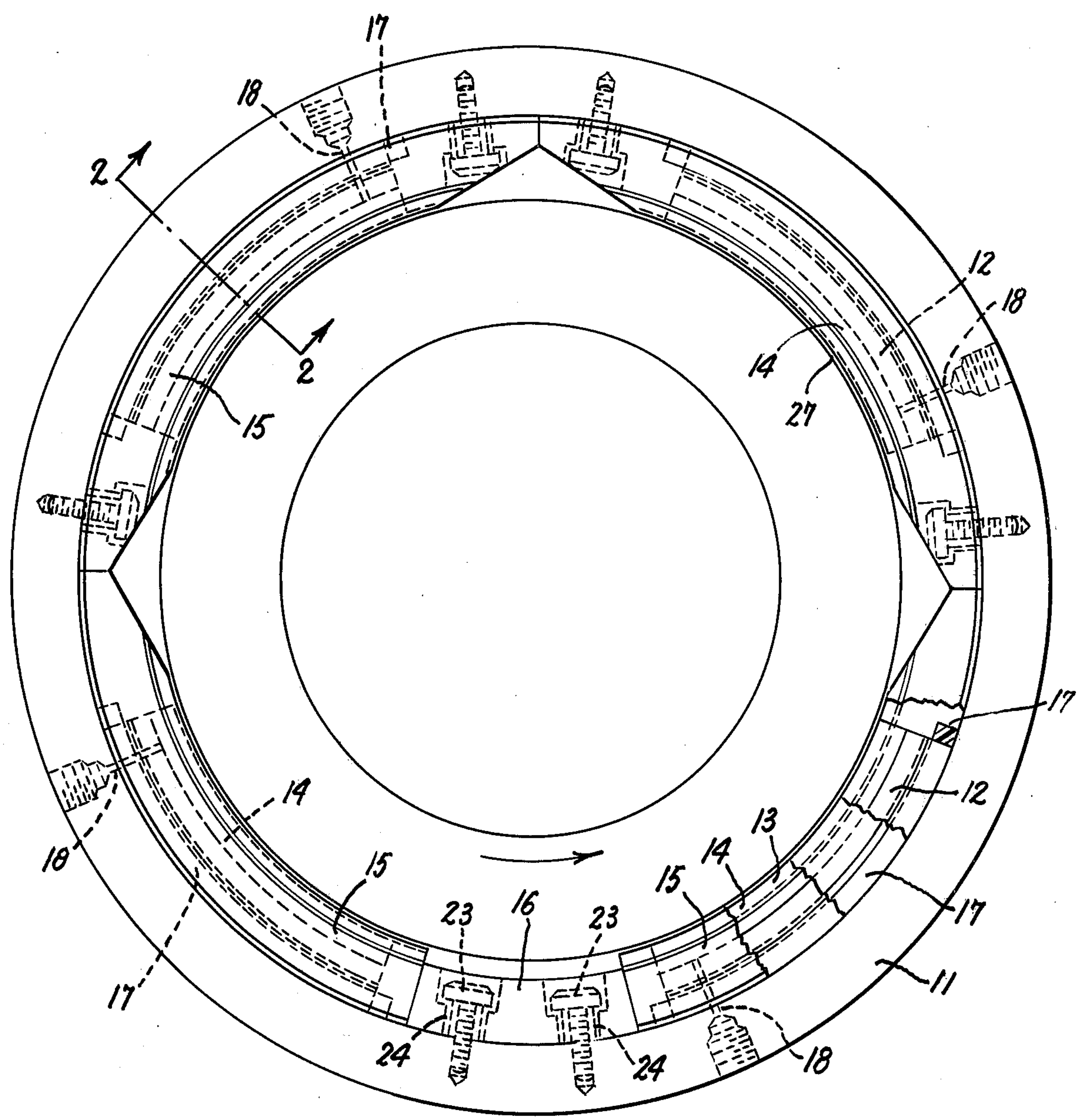
FIG. 1 is a side view of a rotor and stator ring in an acyclic machine, with portions shown partially broken away.

FIG. 1 illustrates a single rotor ring 10 and cooperating stator ring 11 in electrical contact therewith through a plurality of stator fins 12 protruding radially-inward from stator ring 11, and a liquid metal, conveniently a sodium-potassium alloy (NaK) 13 filling the region 14 between the radially-innermost surface of each of fins 12 and the radially-outermost surface of rotor collector ring 10. The liquid metal is generally retained axially and circumferentially in region 14 by cage sectors 15, each of which is fitted about a respective stator fin 12. The cage sectors abut each other circumferentially and are held in place circumferentially by a circumferential spacing block 16 which is slid axially into place to complete an annulus of cage sectors 15 and spacing block 16 exerting a radially-outward force on the radially-inner surface of stator ring 11.

Spacing block 16 is affixed to stator collector ring 11 by countersunk screws 23 fastened down upon tubular metallic spacers 24, respectively. Spacers 24 are of smaller diameter than the bore of the holes in spacing block 16, and the lengths of spacers 24 are greater than the corresponding lengths of the clearance holes 25 around the spacers, thereby allowing the spacing block a minute amount of circumferential movement as needed in order to ensure a continual tight circumferential fit of cage sectors 15 in the machine. This also allows spacing blocks 16 to undergo a slight amount of radial displacement when necessary in order to maintain the tight circumferential fit among cage sectors 15 when the cage sectors may be moved outwardly during initial operation of the machine, due either to assembly tolerances or a slight amount of eccentricity in the outermost surface of rotor collector ring 10.

A resilient o-ring 17, preferably of elastomeric material, surrounds each of stator fins 12, respectively, in the region between each of cage sectors 15, respectively, and stator collector ring 11. The o-ring serves the dual purpose of providing a seal against undue loss of liquid metal from the region between cage sectors 15 and stator ring 11, and acting as a compression spring between stator ring 11 and each of cage sectors 15 so as to urge the cage sectors radially inward into close proximity with rotor collector ring 10. The minimum diameter of the generally circular configuration established by cage sectors 15 occurs when the cage sectors touch each other at their ends, and spacing block 16 touches a cage sector 15 at either end thereof. The cage sectors are pushed radially inward to this position by the compression spring action of o-rings 17. By this arrangement, each cage sector 15 is free to move radially outward, compressing the o-ring, and then be returned to the minimum diameter position by spring pressure from the o-ring. This minimum diameter position of cage sectors 15 is larger than the diameter of the outermost surface of rotor collector ring 10 by a predetermined small radial clearance, typically of about 0.0015 inches for a 30-inch diameter disk acyclic machine of 3000 horsepower. If any one of cage sectors 15 approaches too closely to rotor collector ring 10, momentary contact with the rotor collector ring pushes the cage sector radially-outward until it clears the most extreme portion of the radially-outermost surface of rotor collector ring 10, thereby providing eccentric runout tolerance. Each of cage sectors 15 is thus self-adjusting to maintain itself concentric with, and at a small clearance from, rotor collector ring 10.

A liquid metal supply port 18 is provided near one end of each of stator fins 15, which is the end first encountered by rotor collector ring 10 as it rotates in its normal direction of rotation. Liquid metal, under pressure, is supplied through these holes to fill the volumes enclosed by rotor 10 and each of cage sectors 15, stator fins 12, and o-rings 17. Under this pressure, the liquid metal flows out around fins 12 through the very small gaps between rotor 10 and each of cage sectors 15. The rate of liquid flow is limited by the supply pressure and by the flow resistance of these very small gaps. Viscous losses in the liquid metal during rotation of rotor collector ring 10 (in the direction of the arrow shown in FIG. 1), as well as any other losses dissipating heat into the liquid metal inside any cage sector, are convectively carried away in the escaping liquid metal, thus maintaining all surfaces wetted by the liquid metal within controlled temperature limits. The liquid metal escaping from each cage sector 15 gathers, gravitationally, at the bottom of stator ring 11, from where it is drained into the inlet side of an external pump (not shown). The liquid metal is then pumped through heat exchanger passageways, cooled, degassed if necessary, and returned as a liquid under pressure to inlet ports 18 in each of stator fins 12. Rotation of rotor collector ring 10 in the direction indicated by the arrow, which is its normal, or forward, direction of rotation, tends to spread the liquid metal uniformly over the radially-innermost surfaces of each of stator fins 12 and each of the cage sectors 15. However, in the event of a complete halt, or even reversal, of rotation, liquid metal continues to be supplied through inlet ports 18 and the small clearance between rotor collector ring 10 and cage sectors 15, as well as the presence of o-rings 17, precludes complete escape of liquid metal from region 14, allowing the machine to continue to operate satisfactorily.

Figure 2:
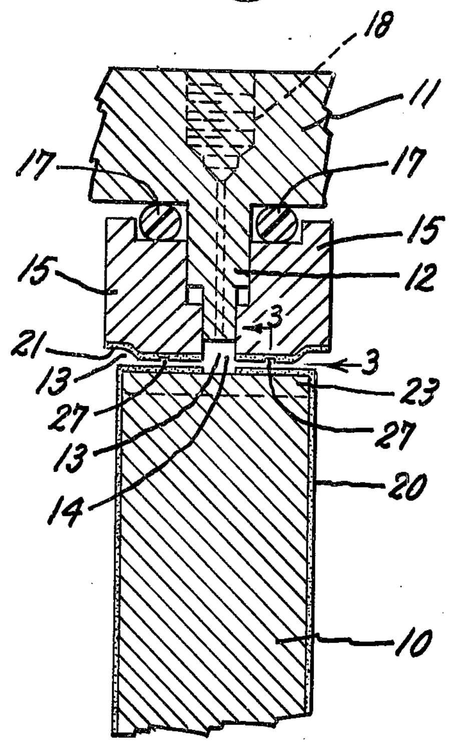
FIG. 2 is a sectional view taken along line 2—2 of FIG. 1.

As illustrated in FIG. 2, rotor collector ring 10 is coated with an insulating layer 20 that is open at region 14 in order to permit liquid metal 13 situated therein to make contact with the rotor collector ring at a continuous band in axial alignment with region 14 only. Similarly, an insulating coating 21 is supplied over the radially-inner surface of each of cage sectors 15. Coatings 20 and 21 may typically comprise alumina, and are applied so as to ensure that electrical conduction between rotor collector ring 10 and each of stator fins 12 occurs directly through a liquid metal path in region 14. Although rotor collector ring 10 is typically fabricated of iron, peripheral tip region 23 of the rotor is preferably formed of copper in order to further facilitate electrical conductivity at the outermost periphery of the rotor collector ring.

Although not indicated in the drawings, the machine may conveniently be fabricated with split stator rings to facilitate assembly. This enables the top half of the stator ring to be lifted off the rotor ring at disassembly, or to be lowered onto the rotor ring at assembly. Headed fasteners having design clearances between the fastener and the extended ends of each cage sector may be employed to retain the cage sectors in place in the upper half of the machine during such periods of assembly and disassembly. The design clearances allow each cage sector to be self-locating into its final assembled position and to be self-positioning, as previously described, to its dynamic clearance position around rotor collector ring 10.

Those skilled in the art will appreciate that only one thin liquid metal layer exists between stator fins 12 and rotor collector ring 10, and that essentially no electrical current is carried into or through cage sectors 15. By thus reducing to a minimum the number of series-connected liquid metal-to-solid metal interfaces employed, and also reducing electrical path lengths through the liquid metal so as to utilize only a single liquid metal electrical current transfer between the rotor and stator collector rings, ohmic resistance losses of the liquid metal collector are reduced to the minimum that can adequately allow for the necessary mechanical running clearances between stator fins 12 and rotor ring 10.

Moreover, minimization of liquid metal-to-solid material interface areas also minimizes viscous frictional losses.

Figure 3:
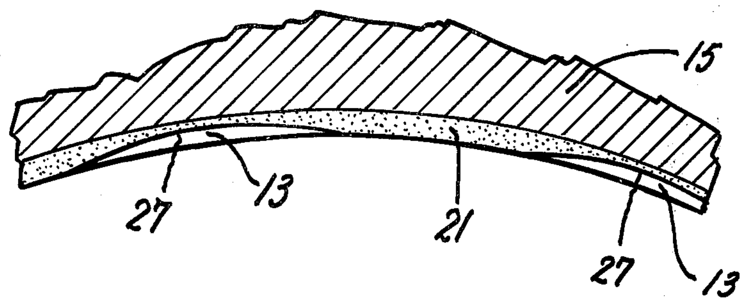
FIG. 3 is a sectional view taken along line 3—3 of FIG. 2.

Situated in ceramic insulation 21 about the radially-innermost surface of each cage sector 15 are a plurality (e.g. two groups of three each) of slots 27. As best shown in FIG. 3, these slots are of arcuate configuration in their circumferential arrangement about rotor collector ring 10. Liquid metal 13 fills slots 27 as it escapes from region 14 within the cage sectors. Rotation of the adjacent rotor collector ring 10 imparts a tangential velocity to the liquid metal which, upon impact with the circumferential end of slot 27, creates a radially-directed pressure between rotor collector ring 10 and each cage sector 15, tending to lift the cage sectors radially-outward by a small amount sufficient to admit the flow of the liquid metal across the radially-innermost face of each cage sector 15. Distributed slots 27 sufficiently distribute these lifting forces to assure very little, if any, direct contact between any of cage sectors 15 and rotor 10.

The foregoing describes a liquid metal current collector which allows continuous electrical contact between predetermined sectors of an acyclic machine stator and rotor collector rings. A liquid metal current collector is provided which exhibits reduced viscous drag losses at high operating speeds while allowing operation at and through zero operating speed by precluding complete loss of liquid metal between the stator and rotor collector rings under these conditions. The machine requires but a single liquid metal electrical current transfer between rotor and stator collector rings.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

I claim:

1. An electrical current collector for an acyclic machine, comprising:

a rotor collector ring;

a stator collector ring encircling said rotor collector ring and including a plurality of stator fins protruding radially-inward from said stator collector ring and terminating at a location closely-adjacent the radially-outer surface of said rotor collector ring;

a plurality of circumferentially-abutting cage sectors, each of said cage sectors surrounding a stator fin, respectively, and forming a raceway in the space defined axially by said cage sectors and circumferentially by the radially-innermost surfaces of said fins and the radially-outermost surface of said rotor collector ring;

means biasing said cage sectors toward the radially-outermost surface of said rotor collector ring; and liquid metal situated in said raceway, said liquid metal making physical contact with the radially-innermost surface of each of said stator fins and the radially-outermost surface of said rotor collector ring.

2. The apparatus of claim 1 wherein the radially-innermost surface of each of said cage sectors is coated with electrical insulation.

3. The apparatus of claim 2 wherein said rotor collector ring is coated with electrical insulation over its entire outermost surface except for a band situated in alignment with said raceway in said space defined axially by said cage sectors.

4. The apparatus of claim 1 wherein said means biasing said cage sectors toward the radially-outermost surface of said rotor collector ring comprises compressible means situated between said stator collector ring and each of said cage sectors.

5. The apparatus of claim 4 wherein said compressible means comprises an o-ring surrounding each of said stator fins, respectively.

6. The apparatus of claim 1 including a port extending radially through each of said stator fins, respectively, and through said stator collector ring, for admitting liquid metal into said raceway.

7. The apparatus of claim 3 including liquid metal between the insulation coating on said rotor collector ring and the insulation coating on the radially-innermost surface of each of said cage sectors.

8. The apparatus of claim 7 wherein said means biasing said cage sectors against the radially-outermost surface of said rotor collector ring comprises compressible means situated between said stator collector ring and each of said cage sectors.

9. The apparatus of claim 8 wherein said compressible means comprises an o-ring surrounding each of said stator fins, respectively.

10. The apparatus of claim 1 including a spacing block completing an annulus together with said cage sectors, said spacing block abutting a separate cage sector at either circumferential end, respectively.

11. The apparatus of claim 6 wherein each said port is located nearer one circumferential end of each of said stator fins, respectively, through which it passes.

* * * * *